(12) United States Patent
Han et al.

(10) Patent No.: US 7,168,425 B2
(45) Date of Patent: Jan. 30, 2007

(54) COOKING APPARATUS

(75) Inventors: Dae-Sung Han, Hwasung (KR); Chul Kim, Yongin (KR); Yong-Woon Han, Kunpo (KR); Seong-Deog Jang, Suwon (KR); Kyung-Hee Hahm, Seoul (KR); Joo-Yeong Yeo, Hwasung (KR); Han-Seong Kang, Suwon (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 0 days.

(21) Appl. No.: 10/705,893

(22) Filed: Nov. 13, 2003

(65) Prior Publication Data

US 2004/0154613 A1    Aug. 12, 2004

(30) Foreign Application Priority Data

Feb. 6, 2003    (KR) ............... 10-2003-0007561

(51) Int. Cl.
    *F24C 15/00*    (2006.01)
(52) U.S. Cl. ............ 126/25 R; 126/9 R; 126/299 R; 99/447
(58) Field of Classification Search ............ 126/299 R, 126/299 D, 299 C, 25 R, 9 R, 39 R, 41 R, 126/50, 211, 214 R, 37 R; 99/340, 447
    See application file for complete search history.

(56) References Cited

U.S. PATENT DOCUMENTS

| | | | |
|---|---|---|---|
| 3,152,242 A | 10/1964 | De Mott | 392/416 |
| 3,154,004 A | 10/1964 | Huck | 99/390 |
| 3,371,659 A * | 3/1968 | Paspalas | 126/43 |
| 4,508,024 A * | 4/1985 | Perkins | 99/340 |
| 4,865,864 A | 9/1989 | Rijswijck | |
| 4,893,609 A * | 1/1990 | Giordani et al. | 122/18.4 |
| 5,189,945 A | 3/1993 | Hennick | 126/25 R |
| 5,372,121 A * | 12/1994 | Castillo et al. | 126/214 R |
| 5,535,733 A * | 7/1996 | Hait | 126/25 R |
| 6,125,838 A * | 10/2000 | Hedgpeth | 126/41 R |

(Continued)

FOREIGN PATENT DOCUMENTS

FR    2 670 274    6/1992

(Continued)

OTHER PUBLICATIONS

Patent Abstract of Korea Publication No. 2002-16089 dated Mar. 4, 2002.

(Continued)

*Primary Examiner*—Josiah C. Cocks
(74) *Attorney, Agent, or Firm*—Staas & Halsey LLP

(57) ABSTRACT

A cooking apparatus, which is provided with a cover having an air ventilation structure that ventilates air into and out of a cooking space to maintain a desirable temperature of the cooking space. Accordingly, the cooking apparatus has at least one heating unit, a grill unit, such that food laid thereon is cooked by heat from the heating unit, and the cover, covering the food, defining a cooking space thereunder, and having the air ventilation structure to ventilate air into and out of the cooking space during cooking. Food and oil are prevented from being burned, so that carcinogenic substances and smoke are not generated, and convenience of use is increased.

13 Claims, 4 Drawing Sheets

U.S. PATENT DOCUMENTS 6,293,276 B1 * 9/2001 Owens et al. ........... 126/299 D
2001/0039884 A1  11/2001 Backus et al.

FOREIGN PATENT DOCUMENTS

FR   2 724 833 A1 *  3/1996
GB   2 286 111       8/1995

OTHER PUBLICATIONS

Patent Abstract of Japan Publication No. 2001-120440 dated May 8, 2001.
Patent Abstract of Japan Publication No. 2000-254007 dated Sep. 19, 2000.
Patent Abstract of Japan Publication No. 2000-166771 dated Jun. 20, 2000.
Patent Abstract of Japan Publication No. 03-026216 dated Feb. 4, 1991.
Korean Patent Abstract for Korean Publication No. 2002-16089, published Mar. 4, 2002.
Japanese Patent Abstract for Japanese Publication No. 11-267032, published Oct. 5, 1999.
U.S. Appl. No. 10/736,836, filed Dec. 17, 2003, Han et al.
U.S. Appl. No. 10/659,380, filed Sep. 11, 2003, Han et al.
U.S. Appl. No. 10/681,132, filed Oct. 9, 2003, Han et al.
U.S. Appl. No. 10/681,136, filed Oct. 9, 2003, Han et al.
U.S. Appl. No. 10/682,548, filed Oct. 10, 2003, Han et al.
U.S. Appl. No. 10/687,603, filed Oct. 20, 2003, Han et al.
U.S. Appl. No. 10/689,746, filed Oct. 22, 2003, Han et al.
U.S. Appl. No. 10/691,551, filed Oct. 24, 2003, Han et al.
U.S. Appl. No. 10/706,926, filed Nov. 14, 2003, Han et al.
U.S. Appl. No. 10/713,159, filed Nov. 17, 2003, Han et al.

* cited by examiner

COOKING APPARATUS

CROSS-REFERENCE TO RELATED APPLICATIONS

This application claims the benefit of Korean Application No. 2003-7561, filed Feb. 6, 2003, in the Korean Intellectual Property Office, the disclosure of which is incorporated herein by reference.

BACKGROUND OF THE INVENTION

1. Field of the Invention

The present invention relates, in general, to a cooking apparatus, and more particularly, to a structure of a cover that covers food laid on a grill unit.

2. Description of the Related Art

Generally, meat or processed meat tastes best when cooked by being grilled on a grill. A conventional cooking apparatus using a grill includes a cabinet that is provided with a heating unit, and a grill unit that is laid on the cabinet and supports food to be cooked by heat. The cooking apparatus is generally provided with a cover that covers food to be cooked, and defines a cooking space shut off from outside air so that moisture is retained in the meat.

But a temperature of the cooking space shut off from the outside air can increase to 300° C. or higher during cooking. Accordingly, food to be cooked and oil discharged from the food are burned, so that smoke and carcinogenic substances may be generated, and inconveniences may result from the generation of the smoke. Particularly, the problems are more serious when the cooking apparatus is used indoors.

SUMMARY OF THE INVENTION

It is an aspect of the present invention to provide a cooking apparatus, with a cover having an air ventilation structure that ventilates air into and out of a cooking space to maintain a desirable temperature of the cooking space.

Another aspect of the present invention is to provide a cooking apparatus, provided with a cover, in which the air ventilation structure operates more efficiently.

Additional aspects and advantages of the invention will be set forth in part in the description which follows and, in part, will be obvious from the description, or may be learned by practice of the invention.

The foregoing and/or other aspects of the present invention are achieved by providing a cooking apparatus having at least one heating unit, a grill unit such that food laid thereon is cooked by heat from the heating unit, and a cover covering the food, defining a cooking space thereunder, and having an air ventilation structure to ventilate air into and out of the cooking space during cooking.

According to one aspect, the air ventilation structure enables a temperature of the cooking space to be maintained below 260° C.

According to one aspect, the air ventilation structure has a side portion of the cover with at least one air inlet hole, to allow inflow of air therethrough during cooking, and a top portion of the cover with at least one air outlet hole, to allow outflow of air therethrough during cooking. According to one aspect, the top portion of the cover has at least two air outlet holes arranged in two opposite portions of the top member of the cover. According to one aspect, a total area of the air outlet holes ranges from 5% to 25% of an effective area of the grill unit. Further, according to one aspect, at least one air inlet hole is arranged away from at least one heater unit, so that a temperature of air flowing into the cooking space is minimized.

Further, aspects of the present invention are achieved by providing a cooking apparatus having: at least one heating unit; a grill unit, such that food laid thereon is cooked by heat from the heating unit, which has a pair of water tanks with water therein, spaced apart from each other, and a plurality of grilling pipes communicating with the pair of water tanks such that the water contained in the water tanks flows into the plurality of the pipes; and a cover covering the food, defining a cooking space thereunder, and having at least one air ventilation hole.

Further, aspects of the present invention are achieved by providing a cooking apparatus having: at least one heating unit; a grill unit, such that food laid thereon is cooked by heat from the heating unit; a heat-reflecting unit seated adjacent to the grill unit, reflecting heat radiated from the heating unit to the grill unit, and containing water therein to prevent materials dropping from the food from being burned; and a cover covering the food, defining a cooking space thereunder, and having at least one air ventilation hole.

BRIEF DESCRIPTION OF THE DRAWINGS

The above and/or other aspects and advantages of the invention will become apparent and more readily appreciated from the following detailed description of the embodiments, taken in conjunction with the accompanying drawings of which.

DETAILED DESCRIPTION OF THE PREFERRED EMBODIMENTS

Figure 1:
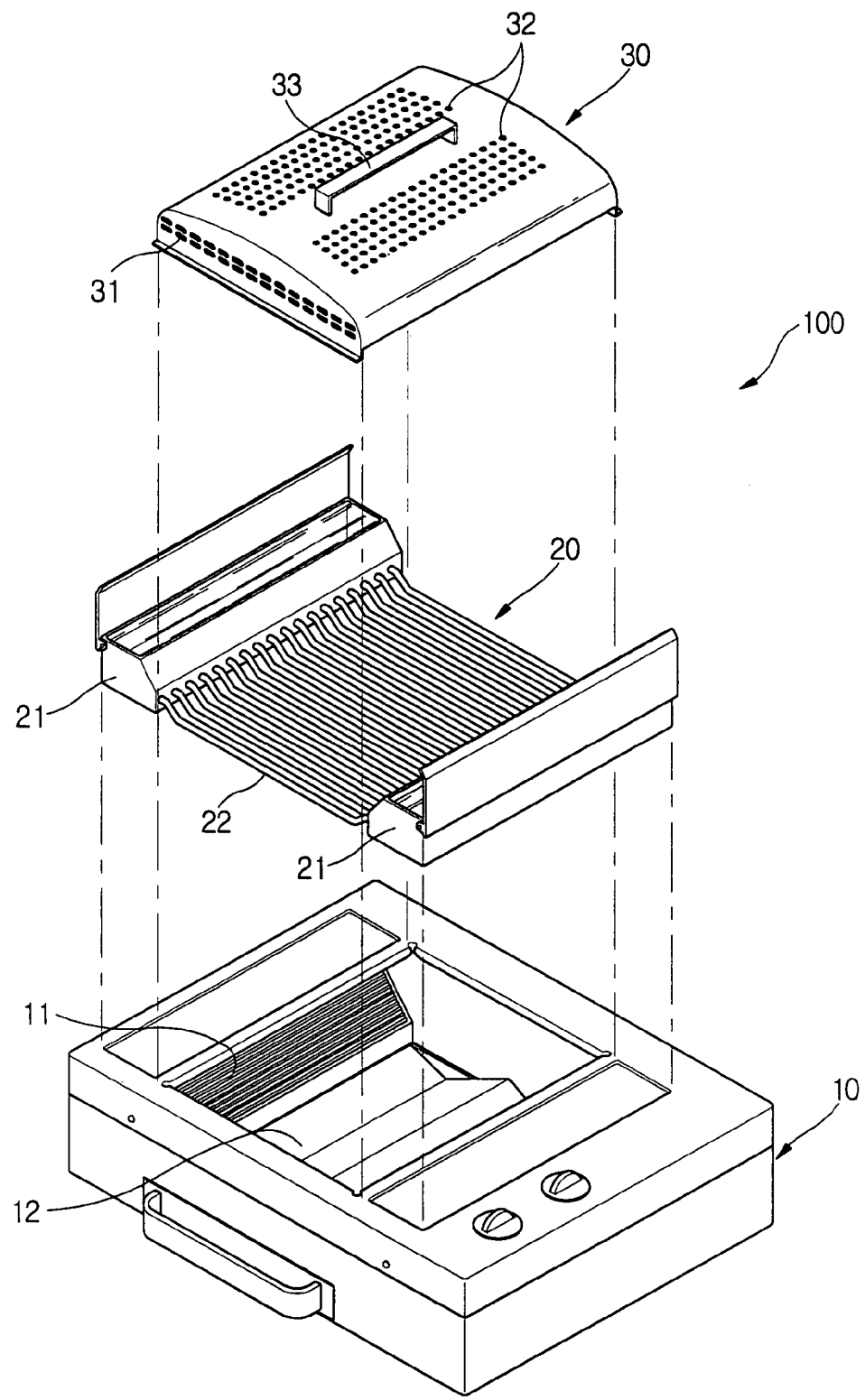
FIG. 1 is an exploded perspective view of a cooking apparatus according to an embodiment of the present invention.

Reference will now be made in detail to the embodiments of the present invention, examples of which are illustrated in the accompanying drawings, wherein like reference numerals refer to the like elements throughout. The embodiments are described to explain the present invention by referring to the figures.

Figure 2:
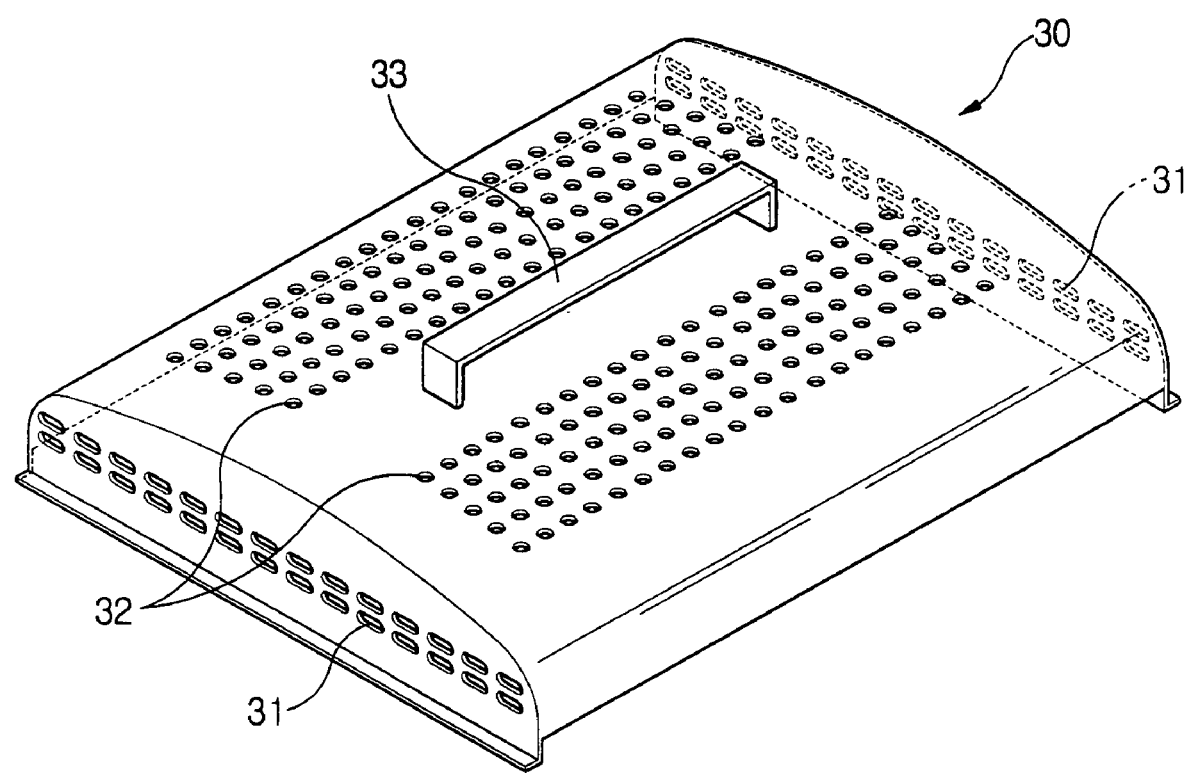
FIG. 2 is an enlarged perspective view of a cover of FIG. 1.

FIG. 1 is an exploded view of a cooking apparatus 100, according to an embodiment of the present invention. FIG. 2 is an enlarged perspective view of a cover 30 of FIG. 1.

Referring to FIGS. 1 and 2, the cooking apparatus 100 includes a cabinet 10, two ceramic heaters 11, a grill unit 20, the cover 30, and a heat-reflecting unit 12. The ceramic heaters 11 heat food, and are arranged on left and right sides of the cabinet 10, and are parallel with each other. The grill unit 20 is positioned to be crosswise between both the ceramic heaters 11 to hold food to be cooked by heat radiated from the ceramic heaters 11. The cover 30 covers a space above the grill unit 20. The heat-reflecting unit 12 is seated below the grill unit 20 and reflects heat radiated from the ceramic heaters 11 to the grill unit 20. The heat-reflecting unit 12 contains water therein, to prevent oil dropping from the food from being burned.

The grill unit 20 includes two water tanks 21, and a plurality of grilling pipes 22. The water tanks 21 are seated on both sides of a top surface of the cabinet 10, are spaced apart from each other, and contain water therein. The grilling pipes 22 connect the two water tanks 21 and are filled with water from the water tanks 21.

The cover 30 has a side member defining a rectangular frame with a predetermined height, and a top member, which together, define a cooking space 40. The cover 30 is provided with a plurality of air inlet holes 31, a plurality of air outlet holes 32, and a handle 33. The air inlet holes 31 are positioned in front and rear side portions of the side member of the cover 30, to allow outside air to flow into the cooking space 40 therethrough. The air inlet holes 31 do not face the ceramic heaters 11 when the cover 30 is laid to cover food. The air outlet holes 32 are positioned in the top member of the cover 30, so that air heated in the cooking space 40 flows out of the cooking space 40 to the outside. The handle 33 is positioned on a center portion of the cover 30. The air inlet holes 31 are arranged to not face the ceramic heaters 11 to prevent outside air in the vicinity of the air inlet holes 31 from being heated by the ceramic heaters 11. Thus outside air flowing into the cooking space 40 is not heated by the ceramic heaters, thereby increasing an efficiency of operation of the air inlet holes 31.

Hereinafter, the operation of cooking apparatus 100 constructed as described above, will be described with reference to FIG. 3.

Figure 3:
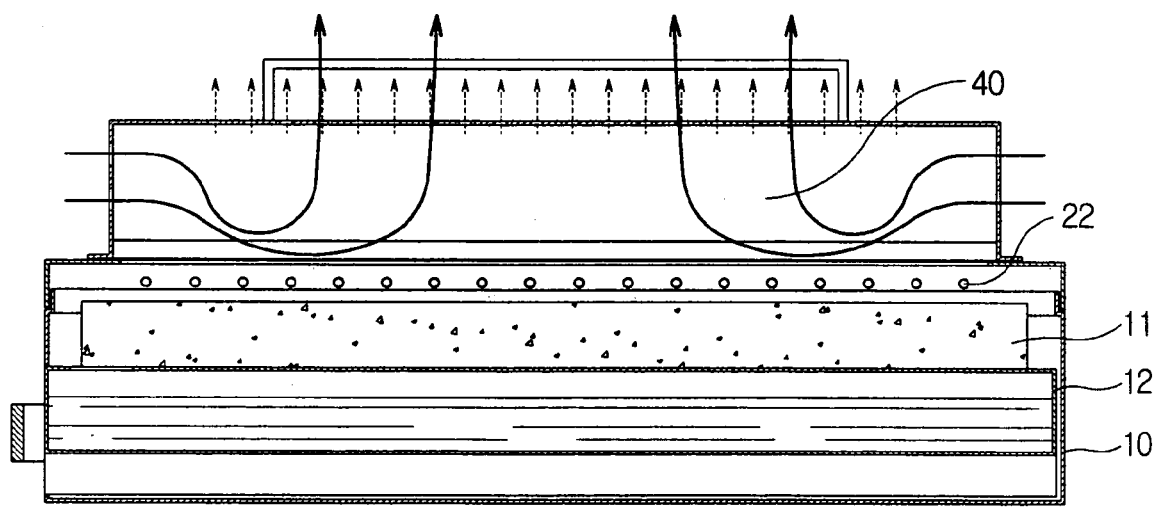
FIG. 3 is a side sectional view of the cooking apparatus of FIG. 1.

FIG. 3 is a side sectional view of the cooking apparatus 100 of FIG. 1.

If a user (not shown) supplies power to the ceramic heaters 11 seated on both sides of the cabinet 10, after laying food on the plurality of grilling pipes 22 of the grill unit 20 and placing the cover 30 over the grill unit 20, then heat radiated from the heated ceramic heaters 11 is applied to the food and the cooking space 40.

Due to heat expansion, a density of air of the cooking space 40 heated by the ceramic heaters 11 decreases, so that the air rises to an upper portion of the cooking space 40 as shown by straight dotted line arrows of FIG. 3, and flows out of the cooking space 40 through the air outlet holes 32. Concurrently, the pressure of air of the cooking space 40 becomes relatively low compared to that of outside air, so that the relatively high-pressure, low-temperature outside air flows into side portions of the cooking space 40 through the air inlet holes 31.

As described above, FIG. 3 shows solid line arrows that illustrate schematic paths, along which air flows out of the cooking space 40 through the air outlet holes 32, after the air flowing into the cooking space 40 through the air inlet holes 31 is heated. Since air flowing into the cooking space 40 through the air inlet holes 31 is cool, a density of the cool air is relatively high and therefore the air descends, so that heated air that is relatively less dense ascends.

As shown in FIGS. 1 and 2, to allow smooth inflow and outflow of air, the plurality of air inlet holes 31 are positioned in the side portions of the cover 30, and the plurality of air outlet holes 32 are symmetrically arranged in two opposing portions of the top member of the cover 30, with the handle 33 being positioned between the two portions. That is, the air inlet holes 31 and air outlet holes 32 serve as ventilation holes to smoothly ventilate air into and out of the cooking space 40.

Depending on the positions of the ventilation holes, the ventilation holes are divided into the air inlet holes 31, that serve as an air inlet unit, through which most air flows into the cooking space 40, and air outlet holes 32, that serve as an air outlet unit, through which most air flows out of the cooking space 40. The ventilation holes are constructed to serve as an air ventilation structure that ventilates air into and out of the cooking space 40.

It was confirmed through various tests that when a temperature of the cooking space 40 was below 260° C., food was not burned, and therefore smoke was not generated. Accordingly, it is desirable that the air ventilation structure, that is, the ventilation holes including the air inlet holes 31 and air outlet holes 32, allows the temperature of the cooking space 40 to be maintained below 260° C.

There will be described hereinafter examples of tests using various ventilation hole configurations with respect to the cooking apparatus 100.

In a first test, an effective area of the grill unit 20 on which food is laid was set to 312 mm×284 mm. The air inlet holes 31 were positioned in the side portions of the cover, so that a total area of air inlet holes 31 was set to 6% of the effective area of the grill unit 20. Power consumption was 1700 W, and there was no food in the cooking space 40. The amount of water contained in the heat-reflecting unit 12 was 1300 cc, and the amount of water contained in the water tanks 21 of the grill unit 20 was 700 cc. Cooking time was thirty minutes. The results of the first test carried out under the above-described conditions are shown in the following Table 1.

TABLE 1

| Area of air outlet holes vs. effective area of grill (%) | Temperature of cooking space (° C.) |
| --- | --- |
| 0 | 340 |
| 5 | 260 |
| 10 | 250 |
| 15 | 240 |
| 20 | 230 |
| 25 | 220 |
| 30 | 200 |
| 35 | 170 |

In a second test, the total area of air inlet holes 31 positioned in the side portions of the cover was set to 0% of the effective area of the grill unit 20, and other conditions were the same as those of the first test. In the second test, when there were no air inlet holes 31, the temperature of the cooking space 40 was increased by about 40° C. In this case, the plurality of air outlet holes 32 positioned in the top member of the cover 30 served as ventilation holes allowing air to flow into and out of the cooking space 40. Additionally, it was confirmed that positioning of the air inlet holes in the side portions of the cover was an important factor in decreasing a temperature of the cooking space 40.

Based on the comparison of the results of the first and second tests, the following conclusions were reached.

First, the temperature of the cooking space 40 during cooking can be controlled by positioning at least one ventilation hole, which allows air to be ventilated by a certain amount therethrough, in the cover.

Second, the temperature of the cooking space 40 during cooking can be controlled by the area and locations of the ventilation holes positioned in the cover. Additionally, it is desirable that the air inlet holes 31 allowing inflow of air therethrough are positioned in the side portions of the cover, and the air outlet holes 32 allowing outflow of air therethrough are positioned in the top member of the cover. Based on these conclusions, the desirable ratio of the total area of air outlet holes 32 to the effective area of the grill unit 20 is determined.

Accordingly, third, in the case where the air inlet holes are positioned in the side portions of the cover, the air outlet holes are positioned in the top member of the cover, and the total area of the air outlet holes is 5% of the effective area of the grill unit, the temperature of the cooking space 40 reaches 260° C., the critical temperature at which smoke is generated. Accordingly, it is desirable that the area of the air outlet holes 32 ranges from 5% to 25% of the effective area of the grill unit 20.

Figure 4:
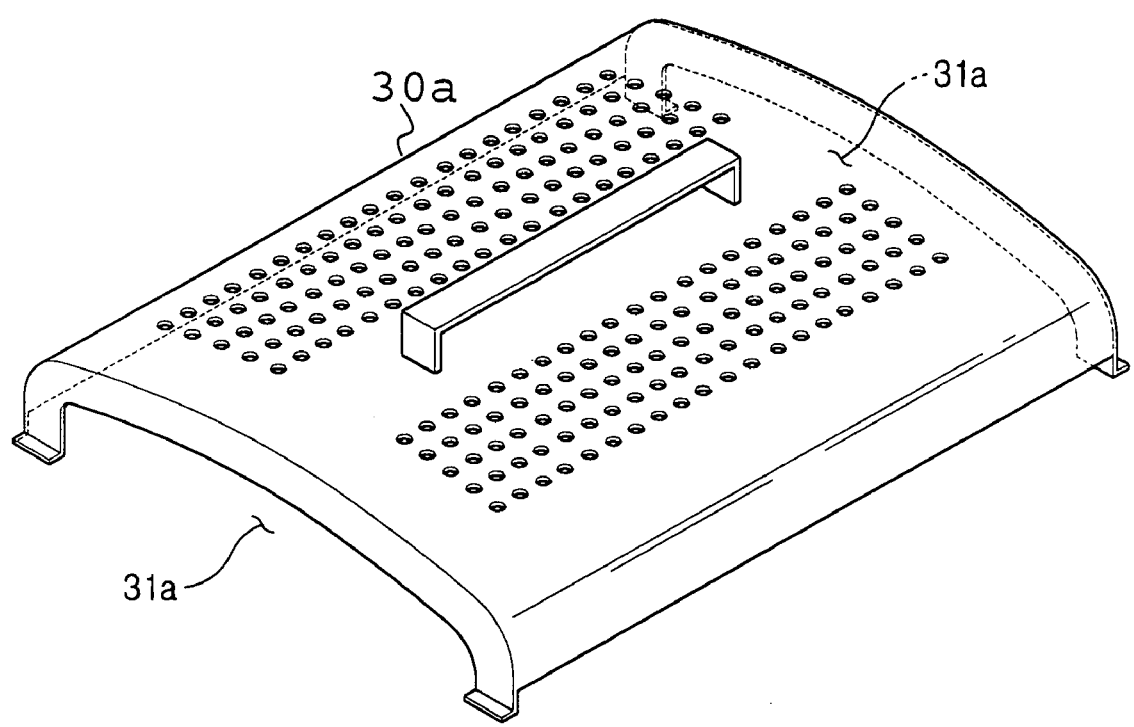
FIG. 4 is a perspective view of a cover according to another embodiment of the present invention.

FIG. 4 is a cover 30a of the cooking apparatus according to another embodiment of the present invention.

In this embodiment, openings 31a, instead of the air inlet holes, are positioned in the front and rear side portions so that lower portions of the cover 30a are open when the cover is placed over the grill unit, thus allowing outside air to flow into the cooking space through the openings 31a.

But the present invention is not limited to the described embodiments. One aspect of the present invention is to maintain the temperature of the cooking space 40 using an air ventilation structure ventilating air into and out of the cooking space 40, and additionally, to improve the efficiency of operation of the air ventilation structure by properly positioning the air ventilation structure.

According to one aspect, different from the previously described embodiments, a heating source radiating heat by combustion of gas, etc., is substituted for the ceramic heaters 11. According to another aspect, a single ventilation hole is constructed to allow both inflow and outflow of air therethrough. In other words, the air inlet nad the air outlet are integrally formed. Even though the single ventilation hole is located in a predetermined position of the cover, air is ventilated into and out of the cooking space, so that this construction falls under the concept of the present invention.

As is apparent from the above description, the present invention provides a cooking apparatus, in which the temperature of the cooking space 40 is properly maintained to prevent food or oil from being burned, thus preventing carcinogenic substances and smoke from being generated, and increasing convenience of use.

Meanwhile, various embodiments that differ from the embodiments shown in FIGS. 1 to 4 may be implemented, but all the embodiments based on a basic concept of the present invention, which is to prevent food from being burned by forming the air ventilation structure allowing inflow and outflow of air, and consequently properly maintaining a temperature of the cooking space, fall under the scope of the present invention.

Although a few embodiments of the present invention have been shown and described, it would be appreciated by those skilled in the art that changes may be made in these embodiments without departing from the principles and spirit of the invention, the scope of which is defined in the claims and their equivalents.

What is claimed is:

1. A cooking apparatus, comprising:
    a cabinet;
    at least two heating units disposed in the cabinet;
    a grill unit- disposed in the cabinet such that food laid thereon is cooked by heat from the heating units; and
    a cover covering the food, defining a cooking space thereunder, and having an air ventilation structure serving as a primary conduit of air into and out of the cooking space during cooking, when the cover is in a closed position, the cover being removably disposed on a to of the cabinet,
    wherein the air ventilation structure comprises opposing side portions of the cover, each with at least one air inlet hole, to allow inflow of the air therethrough during cooking, and
    the heating units are disposed along a first axis at opposing ends of an interior space of the cabinet, and the air inlet holes are disposed in the cover at opposing ends of a second axis transverse to the first axis, such that the inlet holes do not face the heating units.

2. The cooking apparatus as set forth in claim 1, wherein:
    the air ventilation structure enables a temperature of the cooking space to be maintained below 260° C.

3. The cooking apparatus as set forth in claim 1, wherein the air ventilation structure further comprises:
    a top portion of the cover with at least one air outlet hole, to allow outflow of the air therethrough during cooking.

4. The cooking apparatus as set forth in claim 3, wherein:
    the top portion of the cover comprises at least two air outlet holes arranged in two opposite portions of the top member of the cover.

5. The cooking apparatus as set forth in claim 4, wherein:
    a total area of the air outlet holes ranges from 5% to 25% of an effective area of the grill unit.

6. The cooking apparatus as set forth in claim 1, wherein the grill unit comprises:
    a pair of water tanks with water therein, spaced apart from each other; and
    a plurality of grilling pipes communicating with the pair of water tanks such that the water contained in the water tanks flows into the plurality of the pipes.

7. A cooking apparatus comprising:
    a cabinet;
    a pair of heating units disposed at opposing ends of an interior space of the cabinet along a first axis;
    a grill unit disposed in the cabinet; and
    a cover, removably disposed on a top of the cabinet and defining a cooking space between the grill unit and the cover, with
        an air inlet, comprising at least two inlet holes disposed at opposing sides of the cover, and serving as a primary inlet of air into the cooking space when the cover is in a closed position, the inlet holes being positioned along a second axis transverse to the first axis such that the inlet holes do not face the heating units, to prevent outside air in the vicinity of the air inlet from being heated by the heating units, and
        an air outlet to ventilate the air out of the cooking space when the cover is in the closed position.

8. The cooking apparatus according to claim 7, wherein:
    the air outlet comprises at least one outlet hole ventilate air out of the cooking space.

9. The cooking apparatus according to claim 8, wherein the air outlet comprises:
    at least two outlet holes arranged in opposing areas of the cover.

10. The cooking apparatus according to claim 8, wherein:
    a total area of the at least one outlet hole ranges from approximately about 5% to 25% of an effective cooking area of the grill unit.

11. The cooking apparatus according to claim 8, wherein:
    a total area of the at least one outlet hole is sized to maintain a temperature of the cooking space below approximately 260° C.

12. The cooking apparatus according to claim 8, wherein:
    the at least one outlet hole is positioned to maintain a temperature of the cooking space below approximately 260° C.

13. The cooking apparatus as set forth in claim 7, wherein the grill unit comprises:
    a pair of water tanks with water therein, spaced apart from each other; and
    a plurality of grilling pipes communicating with the pair of water tanks such that the water contained in the water tanks flows into the plurality of the pipes.

* * * * *

UNITED STATES PATENT AND TRADEMARK OFFICE
CERTIFICATE OF CORRECTION

PATENT NO. : 7,168,425 B2 Page 1 of 1
APPLICATION NO. : 10/705893
DATED : January 30, 2007
INVENTOR(S) : Dae-Sung Han et al.

It is certified that error appears in the above-identified patent and that said Letters Patent is hereby corrected as shown below:

Column 5, Line 51, change "unit-" to --unit--.

Column 5, Line 58, change "to" to --top--.

Signed and Sealed this

First Day of May, 2007

JON W. DUDAS
*Director of the United States Patent and Trademark Office*